(12) United States Patent
Wysong

(10) Patent No.: US 7,125,204 B2
(45) Date of Patent: Oct. 24, 2006

(54) PORTABLE PNEUMATIC BLOWER

(75) Inventor: Doug Wysong, Camden, OH (US)

(73) Assignee: FINN Corporation, Fairfield, OH (US)

( * ) Notice: Subject to any disclaimer, the term of this patent is extended or adjusted under 35 U.S.C. 154(b) by 108 days.

(21) Appl. No.: 10/699,206

(22) Filed: Oct. 31, 2003

(65) Prior Publication Data

US 2005/0095070 A1    May 5, 2005

(51) Int. Cl.
B65G 53/04    (2006.01)

(52) U.S. Cl. .................. 406/38; 406/66; 406/67; 406/146; 239/77; 239/661

(58) Field of Classification Search ............ 406/38, 406/39, 40, 41, 42, 66, 67, 146; 239/77, 239/172, 661
See application file for complete search history.

(56) References Cited

U.S. PATENT DOCUMENTS

| | | | |
|---|---|---|---|
| 547,024 A | 10/1895 | Neale | |
| 909,423 A | 1/1909 | Keller | |
| 1,371,451 A | 3/1921 | Stacy | |
| 1,629,315 A | 5/1927 | Scott | |
| 2,063,086 A | 12/1936 | FitzGerald | |
| 2,201,279 A | 5/1940 | Willing | |
| 2,842,897 A | 7/1958 | Finn | |
| 3,199,679 A | 8/1965 | Salyer, Jr. | |
| 3,220,555 A | 11/1965 | Siha | |
| 3,374,635 A | 3/1968 | Crandall | |
| 3,379,372 A * | 4/1968 | Nemmaier et al. ............ 239/7 |
| 3,561,219 A | 2/1971 | Nishizawa et al. | |
| 3,617,566 A | 11/1971 | Oshima et al. | |
| 3,696,623 A | 10/1972 | Heine et al. | |
| 3,847,722 A | 11/1974 | Kistner | |
| 3,871,182 A | 3/1975 | Estruco | |
| 3,903,977 A | 9/1975 | Gillette et al. | |
| 3,942,457 A | 3/1976 | Keyes et al. | |
| 3,957,098 A | 5/1976 | Hepworth et al. | |
| 4,005,010 A | 1/1977 | Lunt | |
| 4,076,460 A | 2/1978 | Roof | |
| 4,182,491 A * | 1/1980 | Parke et al. .................. 239/11 |
| 4,353,946 A | 10/1982 | Bowers | |
| 4,497,712 A | 2/1985 | Cowling | |
| 4,524,916 A | 6/1985 | Keyes et al. | |
| 4,599,015 A * | 7/1986 | Krambrock .................. 406/66 |
| 4,635,576 A | 1/1987 | Bowers | |
| 4,655,637 A | 4/1987 | Vignocchi | |
| 4,712,717 A * | 12/1987 | Egerdahl ..................... 239/661 |
| 4,784,773 A | 11/1988 | Sandberg | |
| 4,788,790 A | 12/1988 | Zeager | |
| 4,808,024 A | 2/1989 | Haas | |
| 4,979,960 A | 12/1990 | Rexius et al. | |

(Continued)

FOREIGN PATENT DOCUMENTS

JP    1148717    6/2002

(Continued)

Primary Examiner—Joe Dillon, Jr.
(74) Attorney, Agent, or Firm—Bell, Boyd & Lloyd LLC

(57) ABSTRACT

A portable unit for pneumatically blowing landscaping and/or building materials, such as bark, mulch, fertilizer, compost, wood chips, grass clippings, leaves, gravel/stone, straw, hay, sawdust and combinations thereof is provided. The unit is transportable by: a car trailer, truck trailer, garden tractor trailer; on stakes of a stake bed truck; by a three point hitch; by a forklift and any combination thereof. The unit includes a hopper having an integral airlock feeder in one preferred embodiment. The unit either includes an on-board power supply device, such as an engine, or provides connections for receiving power remotely.

16 Claims, 7 Drawing Sheets

U.S. PATENT DOCUMENTS

| | | | |
|---|---|---|---|
| 5,015,123 A | 5/1991 | Houck et al. | |
| 5,051,028 A | 9/1991 | Houck et al. | |
| D322,792 S | 12/1991 | Park | |
| 5,082,398 A | 1/1992 | Subic | |
| 5,154,543 A | 10/1992 | Houck et al. | |
| 5,181,804 A | 1/1993 | Wysong et al. | |
| 5,188,302 A | 2/1993 | Alvarez | |
| 5,234,207 A | 8/1993 | Lindstrom et al. | |
| 5,248,448 A * | 9/1993 | Waldron et al. | 516/6 |
| 5,299,888 A | 4/1994 | Wysong et al. | |
| 5,330,828 A | 7/1994 | Jacobsen, Jr. et al. | |
| 5,338,131 A | 8/1994 | Bestmann | |
| 5,421,123 A | 6/1995 | Sakate et al. | |
| 5,431,272 A | 7/1995 | Lindstrom | |
| 5,438,521 A | 8/1995 | Lindstrom | |
| 5,485,391 A | 1/1996 | Lindstrom | |
| 5,519,985 A | 5/1996 | Dyck et al. | |
| 5,556,237 A | 9/1996 | Rexius | |
| D376,372 S | 12/1996 | Little et al. | |
| 5,595,458 A | 1/1997 | Grabhorn | |
| 5,636,552 A | 6/1997 | Richardson | |
| 5,669,740 A * | 9/1997 | Townsend et al. | 406/38 |
| 5,692,262 A | 12/1997 | Haupt et al. | |
| 5,725,160 A * | 3/1998 | Harper et al. | 239/654 |
| 5,743,674 A | 4/1998 | Healy | |
| 5,787,775 A | 8/1998 | Stevens et al. | |
| 5,802,906 A | 9/1998 | Lillbacha et al. | |
| D419,568 S | 1/2000 | Baig et al. | |
| 6,027,054 A | 2/2000 | Kaye et al. | |
| 6,036,406 A | 3/2000 | Rexius | |
| 6,041,271 A | 3/2000 | Lindstrom | |
| 6,089,478 A * | 7/2000 | Truan et al. | 239/675 |
| 6,109,835 A | 8/2000 | Grabhorn | |
| 6,112,568 A | 9/2000 | Lindstrom | |
| 6,119,377 A | 9/2000 | Rubio | |
| 6,206,300 B1 * | 3/2001 | Roudebush et al. | 239/77 |
| 6,357,971 B1 | 3/2002 | Rexius | |
| 6,377,864 B1 | 4/2002 | Lindstrom | |
| 6,397,967 B1 | 6/2002 | McIlwraith | |
| 6,422,121 B1 | 7/2002 | Wysong | |
| 6,425,714 B1 | 7/2002 | Waddell | |
| D463,454 S | 9/2002 | Miller et al. | |
| D466,910 S | 12/2002 | Miller et al. | |
| 6,491,479 B1 | 12/2002 | Rexius | |
| 6,910,646 B1 * | 6/2005 | Vernon | 239/650 |
| 2002/0100825 A1 | 8/2002 | Gregory | |
| 2002/0131828 A1 | 9/2002 | Waddell | |

FOREIGN PATENT DOCUMENTS

| | | |
|---|---|---|
| JP | 1148952 | 6/2002 |
| JP | 1148953 | 6/2002 |
| JP | 1148955 | 6/2002 |
| JP | 1148956 | 6/2002 |
| WO | WO 95/07016 | 3/1995 |

* cited by examiner

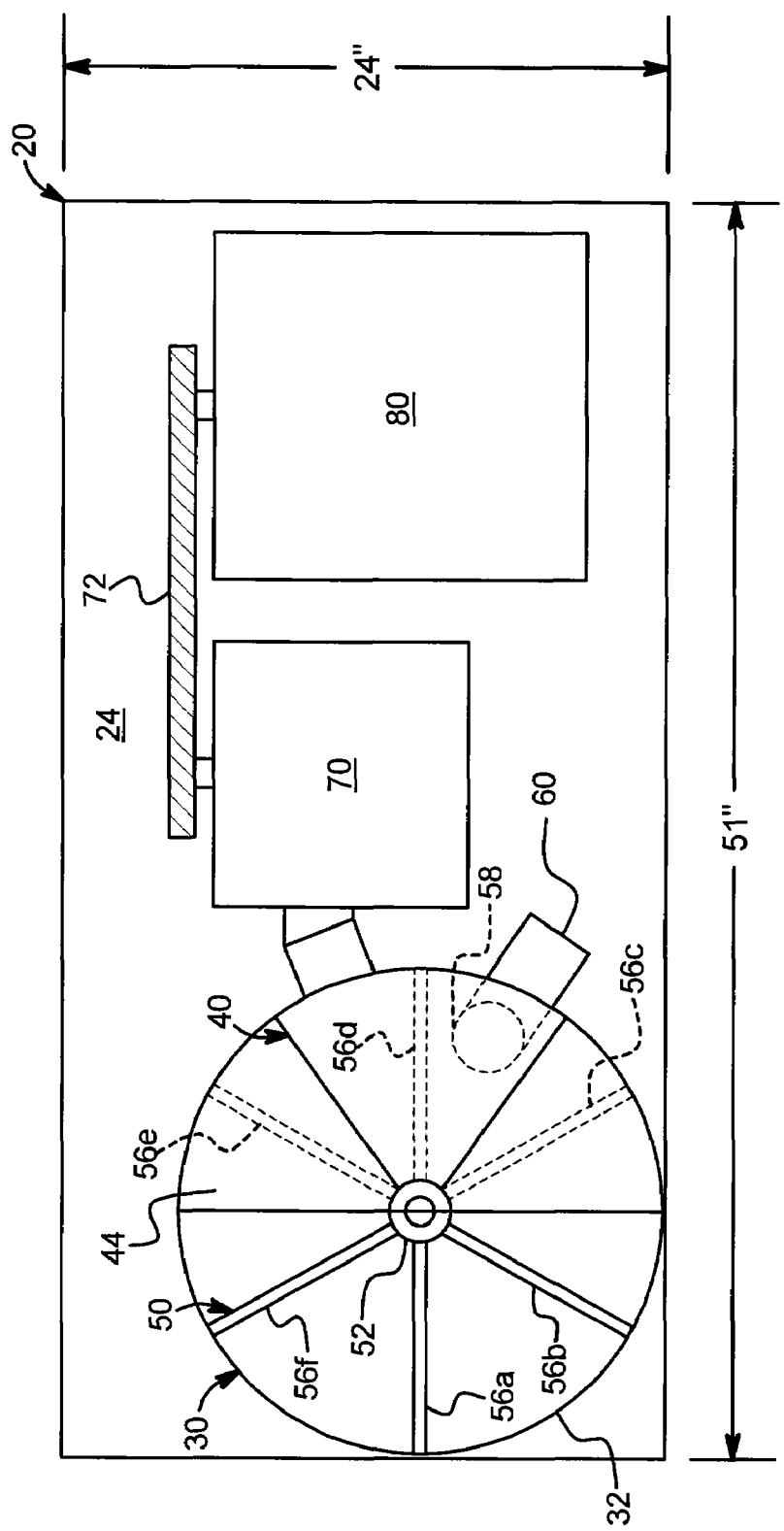

PORTABLE PNEUMATIC BLOWER

BACKGROUND OF THE INVENTION

The present invention relates to landscaping and building equipment and more particularly to pneumatically powered blowers.

In recent years, the real estate market has been increasing. Increases in real estate activity, such as home sales, condominium sales, tear-down houses and new developments have occurred in much of the United States. Much of those trends have resulted in an increased need for building and landscaping materials. That trend is likely to continue as people look increasingly to real estate as a less risky and potentially more profitable investment. The need for equipment to dispense and disperse landscaping and building materials has also increased. Moreover, the healthy real estate market has opened up new areas to market such disbursement equipment.

There has previously existed equipment for dispensing landscaping and building materials. Much if not all of this equipment, however, has been provided on large scale equipment. Typically, a truck tractor or other large horsepower vehicle pulls a trailer upon which the disbursing equipment is connected permanently. For example, U.S. Pat. Nos. 5,556,237 and 6,036,406 set forth a truck trailer that is dedicated, and indeed modified, to permanently convey, feed and blow a large amount and capacity of a loose particulate, such as loose bark, compost, mulch, etc. Similarly, U.S. Pat. No. 6,027,054 and U.S. Patent Application No. 2002/0100825 set forth large tractor trailer apparatuses for blowing straw, which is used as a mulch in large seeding applications. Other types of equipment, such as hydraulic seeders are also provided typically on a large scale, for example, requiring a truck tractor and trailer to transport the seeders.

While the above-described equipment has enjoyed commercial success, its use is better suited for large scale applications. While the larger apparatuses can be used for smaller applications, doing so may not be economical. For example, the above-described blower trucks have hoses that can be transported to reach a remote application. It may not be practical to load the truck and drive it to a point proximate to the application if the application is relatively small. However, if the pneumatic truck is not used, the real estate owner's option is limited to dispensing the materials by hand. The real estate owner must obtain the materials to be disbursed, transport the materials proximate to the application site, manually move the bags or containers of the material to the application site, and shovel or otherwise lift the materials from the bag or container to the application site. Such an endeavor is time-consuming and strenuous. The endeavor is also potentially expensive if instead performed by a contractor.

A need exists for a landscaping or building material disbursing device that is provided on a scale smaller than the devices described above. The user, or a contractor, should be able to tow or drive the device to a relatively small application or to an application that is difficult to otherwise reach. The device should be relatively inexpensive, so that an end-user or homeowner can rent or potentially purchase the device. On the other hand, the device should have enough power and durability to be used by a contractor, such as a lawncare service, regularly and over large stretches of time.

SUMMARY OF THE INVENTION

A portable unit for pneumatically blowing landscaping and/or building materials, such as bark, mulch, fertilizer, compost, wood chips, soil, peat moss, gypsum, dry grass clippings, leaves, seed, herbicide, pesticide or other chemicals, gravel/stone, processed straw or hay, sawdust and combinations thereof is provided. The unit is transportable by: a skid steer loader, a car trailer, truck trailer, garden tractor trailer; on stakes of a stake bed truck, by a three point hitch, by a forklift and any combination thereof. The unit includes a hopper having an integral airlock feeder in one preferred embodiment. The unit either includes an on-board power supply device, such as an engine, or provides connections for receiving power remotely.

The unit is provided in an embodiment having a hopper material capacity of two to ten cubic feet. The unit weights, in one embodiment, about 800 pounds unloaded and about 1,000 pounds loaded. The unit has a relatively small footprint, e.g., about two feet by about four feet, and has a relatively low height profile, e.g., about three and one-half feet. It should thus be appreciated that the unit is readily lifted, hitched, loaded and/or moved. A typical forklift has enough power to lift the weight of the unit, especially the unloaded weight. The unit is also moveable by a relatively small vehicle, such as a car, small pickup truck, skid steer loader or small tractor. The unit can, therefore, in many instances, be brought close to applications that could never before be reached by disbursement equipment, such as applications in wooded areas, on inclines, and in remote places of a lawn or development area.

The hopper with integral airlock and feeder includes in one embodiment a baffle that is welded to an inner surface of the hopper so as to create an air chamber to receive air from the blower. The air chamber is thereby separated from the material that is loaded into the feeder. The material is gravity fed into a feeder, which is located in one embodiment at the bottom of the hopper. The feeder conveys the material underneath the air chamber, wherein the pressurized air in the chamber forces the material in the feeder to exit therefrom via an outlet into a flexible hose. The hose, in one embodiment, is about three inches in diameter and is operated manually. That is, a person holds a distal end of the hose and remotely controls the operation of the feeder to either allow or disallow the flow of material from the hose, while the blower in one embodiment continues to run.

In one embodiment, a motor that drives the feeder is also coupled to a shaft to which auger blades are connected or welded. Thus, while the motor drives the feeder to feed material into the air pressure chamber, the motor also turns the auger, which in turn helps to force the particulate material into the feeder.

In one embodiment, the motor that drives the feeder is a hydraulically driven motor. In one embodiment, the unit includes an onboard engine, which mechanically drives the blower motor. The engine also includes a hydraulic pump that supplies oil pressure to drive the hydraulic feeder motor. In another embodiment, the onboard engine is not provided and the unit instead runs on remote power. That unit includes connections, such as quick disconnects, that enable an external power source to quickly couple to the unit and supply pressurized hydraulic fluid to the feeder motor as well as to a hydraulic motor driving the blower. One possible remote source of power is a common skid steer loader that includes auxiliary hydraulic connections.

In one embodiment, two people man the unit of the present invention: one to continuously load material into the hopper and another to manipulate the disbursement hose. In another embodiment, a single person loads the hopper and then manipulates the hose to disperse the material loaded into the hopper. In either case, pneumatically blowing the material to its ultimate destination is a significantly more efficient method of disbursement than doing so by sweat and shovel.

It is therefore an advantage of the present invention to provide a portable pneumatic blowing unit.

It is another advantage of the present invention to provide a pneumatic blowing unit that can be used by homeowners or contractors.

It is a further advantage of the present invention to provide a pneumatic blowing unit that can be transported by a multitude of different relatively light load vehicles, such as cars, trucks, small tractors, fork lifts, skid steer loaders and the like.

Moreover, it is an advantage of the present invention to provide a pneumatic blowing unit having a feed hopper with an integral airlock and feeder to reduce the size, weight and cost of the unit.

Further still, it is an advantage of the present invention to provide a pneumatic blowing unit that is adaptable to be a stand alone unit with an onboard power source or to be a lighter and even more cost effective unit that derives power from existing equipment.

Yet further, it is an advantage of the present invention to provide a pneumatic blowing unit that is adaptable to blow many different types of materials, such as bark, mulch, fertilizer, compost, wood chips, soil, peat moss, gypsum, dry grass clippings, leaves, seed, herbicide, pesticide or other chemicals, gravel/stone, processed straw or hay, sawdust and any combination thereof.

Additional features and advantages of the present invention are described in, and will be apparent from, the following Detailed Description of the Invention and the figures.

BRIEF DESCRIPTION OF THE FIGURES

FIG. 2 is a top view of the unit of FIG. 1.

DETAILED DESCRIPTION OF THE INVENTION

The present invention includes a portable pneumatic blowing unit that is sized and configured to be transported to reach applications that previous blowers, hydraulic seeders and other like equipment could not reach. The unit is configured to be connected to and transported by a host of different relatively light duty vehicles, such as cars, light trucks and small tractors, which are commonly owned by homeowners, end users and contractors. The unit is inexpensive enough to be rented from retail outlets, such as home improvement stores. The unit is also durable and robust enough to be used by contractors on a day-in/day-out basis and continuously over relatively long stretches of time.

Figure 1:
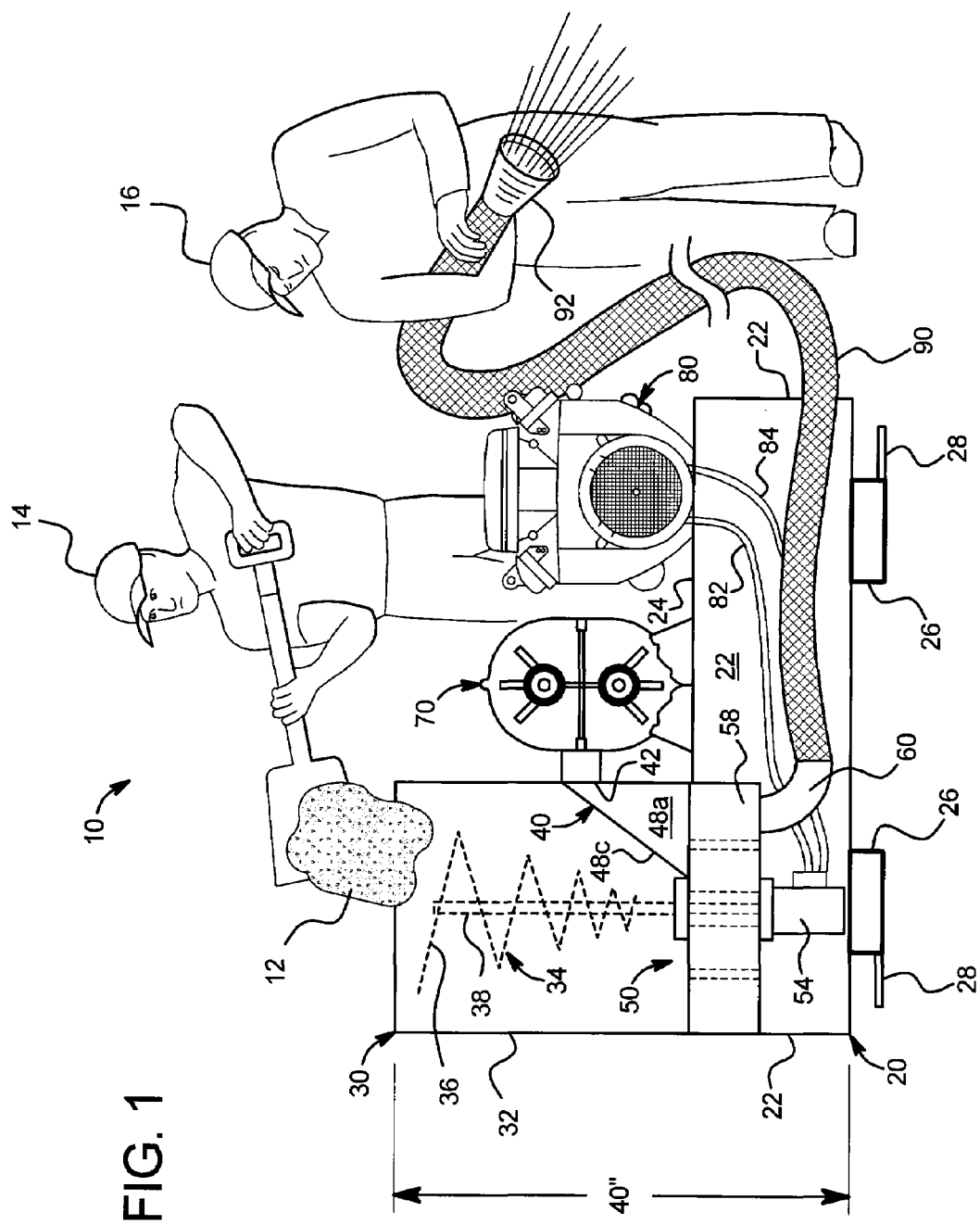
FIG. 1 is a front elevation view of one embodiment of a portable pneumatic material blowing unit of the present invention having an on-board power source.

Referring now to the drawings and, in particular, to FIG. 1, one embodiment of the pneumatic blowing unit if the present invention is illustrated by unit 10. Unit 10 includes a base 20. Base 20 supports a hopper 30, a blower 70 and an engine/hydraulic pump 80. Base 20 is made of metal and/or an industrial strength polymer. For example, Base 20 can include a metal frame with metal, plastic or otherwise synthetic sidewalls and top. The frame (not illustrated) of base 20 supports sidewalls 22 and a top wall 24. Base 20 may or may not include a bottom wall.

The frame of base 20 includes or is attached to forklift or skid steer loader openings 26 and truck stake flanges 28. Forklift openings 26 enable a forklift or skid steer loader to engage and lift unit 10. For example, a forklift could be used to lift unit 10 onto the bed of a pickup truck, wherein the unit is secured to the truck so that the truck can transport unit 10 to the use point. Alternatively, a skid steer loader can engage, lift and directly transport the unit 10 to the application.

A forklift alternatively lifts and places the truck stake flanges 28 of unit 10 onto the stakes of a truck bed (stakes are otherwise known as bed rails, which are placed along the top of the sides of the truck bed, the sides providing stake holes for engaging and securing the stakes). The flanges 28 are secured to the truck stakes, so that the truck can transport unit 10 to the use point.

Either the frame of base 20, the lift openings 26 or the flanges 28 are sized and configured to be mounted to a trailer. The trailer can be a car trailer, truck trailer, tractor trailer (such as a garden tractor trailer) or a "gator" type vehicle. The frame of base 20, lift openings 26 or flanges 28 are also sized and configured to be mounted to a three point hitch. Unit 10 can reside directly on the hitch or be secured to a trailer that is in turn secured to the three point hitch. A tractor via the three point hitch is then able to transport unit 10 to the application destination.

As illustrated, the top 24 of the base 20 in one embodiment defines an opening that enables hopper 30 to be positioned partially beneath the top 24. A material blowing hose 90, which in one embodiment extends from the bottom of hopper 30, is then extended through an inner open portion of base 20 and fed through an aperture defined by one of the sidewalls 22. Mounting the hopper 30 partially beneath top 24 of base 20 enables unit 10 to have an overall lower height profile, which is desirable.

In one embodiment, the hopper 30, blower 70 and engine/pump 80 are mounted on the base 20, which is approximately 24 inches deep and 51 inches wide, as seen in FIG. 2. The hopper 30, which in one embodiment holds two to ten cubic feet of material 12, has a height that creates a overall height of unit 10 of approximately 40 inches, as seen in FIG. 1. It should be appreciated that the above described footprint and height profile for unit 10 is substantially smaller than the footprint and height profile of known pneumatic blowing units, which have in large part been sized to be located on a truck trailer. Unit 10 has an empty weight in one embodiment of about 800 lbs. and an approximate loaded weight of about one thousand lbs. The relatively light weight of unit 10 makes the unit readily transportable via one of the transportation devices discussed above.

Figure 3A:
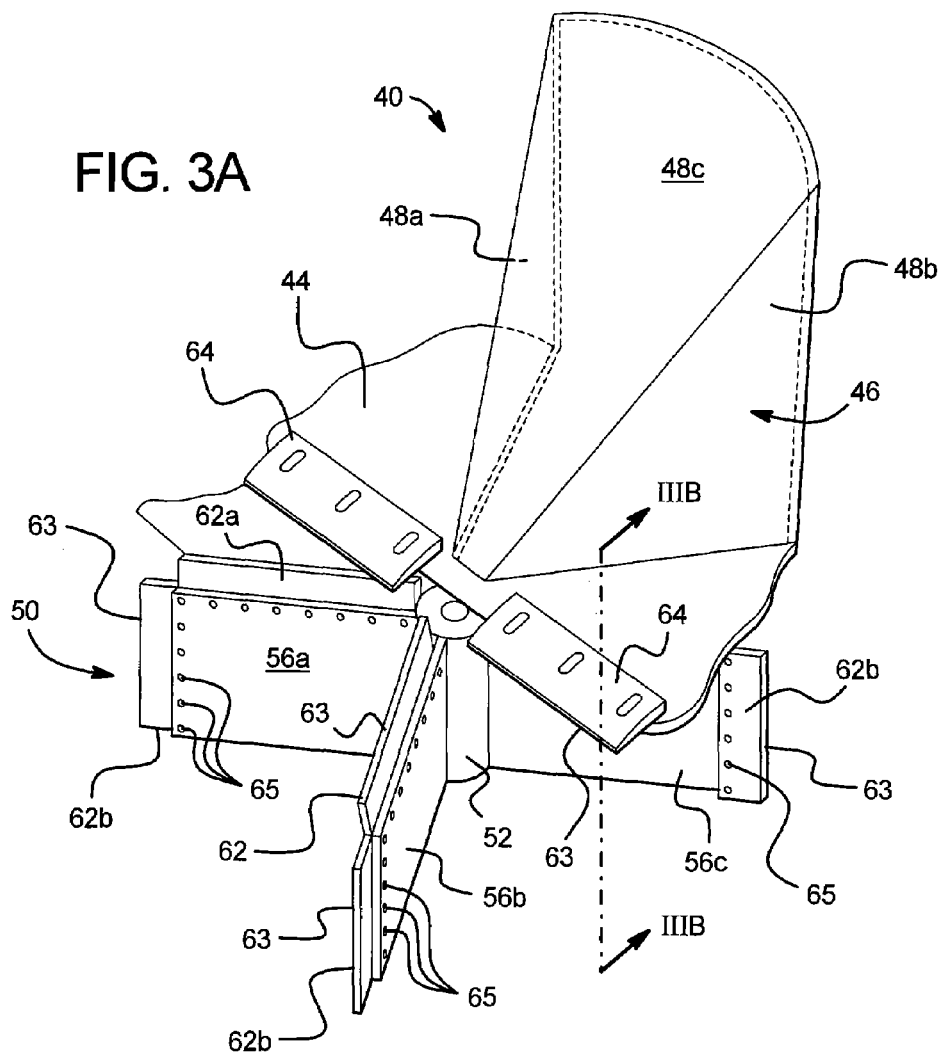
FIG. 3A is a perspective view of a sub-assembly showing an airlock baffle seen in FIGS. 1, 2, 4 and 5 that is welded to the inside of the hopper shell (seen in FIGS. 1 and 2) and seals against the feeder.

FIGS. 1, 2 and 3A illustrate that hopper 30 includes an integral airlock 40 and feeder 50. Hopper 30 includes a shell 32, which in one embodiment is substantially cylindrical. Shell 32 can be metal, such as stainless steel, steel, aluminum and combinations thereof. Shell 32 is partially or totally open on top to allow an operator 14 to load material 12 into the interior of shell 32.

Hopper 30 optionally includes an auger 34. Auger 34 includes a spiral blade 36 and auger shaft 38. In one embodiment, the same motor drives auger shaft 38 and feeder 50. Blade 36 is configured to push material 12 towards feeder 50 when shaft 38 is rotated in the proper direction. As illustrated, blade 36 in one embodiment changes in diameter as it spirals down towards feeder 50. Blade 36 is sized appropriately to enable operator 14 to load material 12 relatively unobstructed into shell 32.

Shell 32 defines a second opening 42, which enables air from blower 70 to enter hopper 30. Airlock or air chamber 40 separates the material 12 from the air entering through opening 42 and channels the air downwardly towards feeder 50. Airlock or air chamber 40 includes a seal plate 44 and a three dimensional trapezoidal shaped baffle 46. Baffle 46 includes two substantially triangular shaped sides 48a and 48b. Baffle 46 also includes a somewhat trapezoidally shaped top 48c. Top 48c includes a rounded edge that conforms to a shape of inner surface of shell 32 of hopper 30. In an embodiment, baffle 46 is bent from a single piece of metal and welded to seal plate 44. Alternatively, a portion or all of seal plate 44 is formed from the same piece of metal from which baffle 46 is formed.

Seal plate 44 is likewise sized and shaped to fit snuggly against the shape (e.g., cylindrical shape) of the inner surface of shell 32 of hopper 30. In one embodiment, airlock or air channel 40 is created in part by welding seal plate 44 horizontally along its rounded edge to the inner surface of shell 32 and then continuing to weld vertically up the edges of triangular sides 48a and 48b. Airlock 40 is also created by welding the curved edge of top 48c of baffle 46 to the inner surface of shell 32. The welds create an air chamber 40 that forces air down towards feeder 50.

Top 48c is also slanted to direct material 12 towards an opening created by substantially semicircular plate 44 to feeder 50. As seen most readily in FIG. 2, material 12 enters feeder 50 through the opening defined by shell 32 and semicircular seal plate 44. Seal plate 44 in the illustrated embodiment is slightly less than a full semicircle, so that shaft 38 of auger 34 can couple to a collar 52 of feeder 50. Collar 52 is coupled to feeder motor 54 (FIG. 1) via any method known to those of skill in the art. In one embodiment, feeder motor 54 face mounts to a bottom of hopper 30. In another embodiment, feeder motor 54 flange mounts to a structural member of the frame of base 20.

It should be appreciated that when shaft 38 of auger 34 is coupled to collar 52, which in turn is coupled to feeder motor 54, auger 34 rotates in a one to one relationship with feeder 50. This is desirable so that auger 34 only pushes material 12 when feeder 50 feeds material through hose 90. In an alternative embodiment, a gear box or other type of gearing device may be used to increase or decrease the angular velocity of auger 34 with respect to the angular velocity of feeder 50, as desired by the implementor of unit 10. Feeder motor 54 in one embodiment is reversible to dislodge a jam that may form in feeder 50. In such a case, it may be desirable to turn auger 34 in the opposite direction to pull material 12 from feeder 50. Auger 34 should not however be allowed to convey material 12 out of hopper 30.

A series of paddles 56a to 56f are integrally formed with or attached to collar 52. More or less than six paddles may alternatively be provided. Paddles 56a to 56f push material 12 that has been gravity fed and fed by auger 34 in between the paddles in a horizontal circular motion toward a third opening 58, which is defined by the bottom of hopper 30. As paddles 56a to 56f continuously funnel material over opening 58, the pressure of the air created within airlocker air chamber 40 forces the material 12 out of hole 58, through elbow 60, through hose 90 and out diffuser 92, which is connected at the distal end of hose 90. Flexible hose 90 in one embodiment is sized between two and five inches in diameter.

Feeder 50 is described herein as being located at the bottom of hopper 30, with hole 58, fitting 60 and hose 90 extending from the bottom of feeder 50. Hole 58, fitting 60 and hose 90 are alternatively located at the side portion of hopper 30. In that alternative case, hose 90 can extend from above or below base 20. In any case, it is desirable to have hole 58 positioned between any two paddles 56a to 56f for as long a time as possible, for a given speed of feeder 50, especially for smaller volumes and pressures of air from blower 70.

Figure 3B:
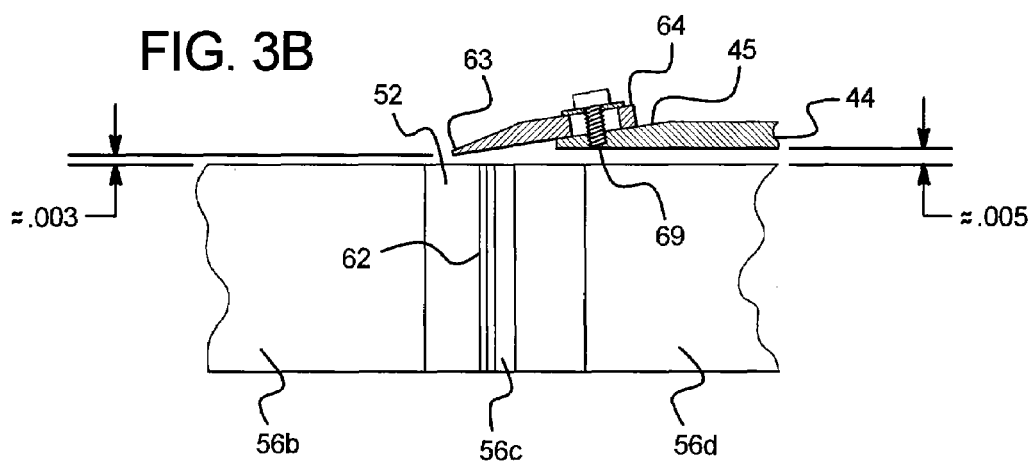
FIG. 3B is a side elevation view taken through the line IIIB—IIIB shown in FIG. 3A.

FIGS. 3A and 3B illustrate that each of the paddles 56a to 56f of feeder 50 can include vertically disposed seals 62 and/or horizontally disposed seals 64. Seals 62 (collectively referring to seals 62a and 62b) and 64 complete the airlock or air chamber 40. Horizontal seals 64 seal the paddles 56a to 56f and the underside of seal plate 44. Top seals 62a are used additionally or alternatively with seals 64 to seal the paddles 56a to 56f and the underside of seal plate 44. Both seals 64 and 62a tend to push or scrape material 12 off the top of paddles 56 into the bottom of hopper 30. Indeed, material 12 can cooperate with plate 44 and seals 64 and 62a to help create a seal between those structures. Side seals 62b (optional) seal paddles 56a to 56f and an inner surface of shell 32. In an alternative embodiment, the inner surface of shell 32 contains a continuous seal, eliminating the need for side paddle seals 62b.

In one embodiment, seals 62 and 64 are removable hardened tool-steel blades that are positioned to create a small clearance between the blades and their mating surfaces. Seals or blades 62 and 64 can be a thick gauge or plate metal, such as ⅜ inch thick metal plate. Other thicknesses may be used alternatively. In one embodiment, blades 62 and 64 are one-half inch to three inches wide and have a sharpened or knife edge 63. The clearance can be adjustable by providing vertical slots on paddles 56 or on blades 62 and 64. Otherwise, the clearance can be preset, for example, by about three mils (0.003 inch) between the blades 62 or 64 and the surfaces of shell 32 and plate 44, respectively.

Vertical seals or blades 62 bolt onto or otherwise removably connect at connection points 65 to paddles 56a to 56f for replacement, re-sharpening, etc. Although not illustrated, additional vertical seals 62 could be placed on the bottom of paddles 56a to 56f to seal the paddles to the bottom of hopper 30. As seen in FIG. 3B, horizontal blades or seals 64, on the other hand, connect via slots 67 in the blades 64 to, for example, threaded holes 69 defined by plate 44. Slots 67 enable blades 64 to move back and forth along the slightly tapered edges 45 of plate 44 to adjust the clearance between the bottom of plate 44 and the top of paddles 56 as desired, e.g., to about 0.003 inch. As seen in FIG. 3B, plate 44 is spaced above paddles 56 a distance relatively close to the desired clearance, e.g., about 0.005 inch, so that blade 64 can thereafter be finely adjusted to the desired clearance.

As seen in FIGS. 1 and 2, Unit 10 includes on-board engine/pump 80. Engine 80 drives blower 70 via a mechanical connection, such as a belt and pulley arrangement 72 in one embodiment. In one embodiment, blower 70 has a capacity of about 100 to about 1000 standard cubic feet per minute at between about 10 and about 20 psig. Blowers, such as blower 70, are commercially available. Engine 80 is sized to be about a ten to fifty horsepower gasoline powered engine and in one preferred embodiment is about twenty-five horsepower. Engine 80 also includes a hydraulic pump that provides pressurized fluid to feeder motor 54 via supply line 82 and return line 84. One suitable engine 80 is made by Kohler Engines, located in Kohler, Wis. Unit 10 it should be appreciated is a total stand alone unit that requires no external source of power for operation.

An operator mans the hose 90 via on/off and possibly variable speed control of feeder 50 to push material 12 through a diffuser 92. The operator that can be the same operator 14 who has earlier delivered materials 12 to hopper 30. Alternatively, a different operator 16 mans hose 90, while another operator 14 continuously or intermittently feeds material 12 into hopper 30.

Material 12 can be bark, mulch, fertilizer, compost, wood chips, soil, peat moss, gypsum, dry grass clippings, leaves, seed, herbicide, pesticide or other chemicals, gravel/stone, processed straw or hay, sawdust and any combination thereof. Any other landscaping or building particulates or spreadable material of a suitable size, weight, density and moisture content may alternatively be dispersed via the pneumatic blowing system of the present invention.

Operator 16 pulls hose 90 from unit 10 to the application, while unit 10 is powered. Operator 14 or 16 controls the flow of material to either flow or not flow through diffuser 92 by controlling whether or not feeder 50 and feeder motor 54 are running. Likewise, the flowrate of material exiting diffuser 92 can be varied by varying the speed of feeder 50/feeder motor 54. The feeder 50 is controlled remotely by operator 16 in one preferred embodiment. Such control is effected via radio frequency ("RF") signal, microwave signal or other type of remote control signal, or via one or more electrical switch coupled, for example, to an electrical wire running from unit 10, along hose 90, to the switch located at the end of hose 90. In an, alternative embodiment, operator 14 situated locally with respect to unit 10 starts and stops the feeder. The blower 70 can be left running when feeder 50 stops running, for example, to blow away residual material 12 from hose 90. Blower 70 can be controlled electrically, for example, to run for a certain amount of time after feeder 50 stops and then stop automatically.

The unit 10 includes a number of safety and control features. First, a motion sensor or pressure sensor can be provided to detect if a jam occurs in feeder 50. Such an event causes the unit 10 to shut down and signal a warning light or siren to the one or more operators 14 or 16. An option is provided for the operator 14, 16 to control the operation of unit 10 remotely. That is, a remote controller can be provided that uses radio frequency or other remote signals to command unit 10 to turn on, shut down, increase or decrease the speed of feeder 50 or reverse feeder 50 to dislodge a jam.

Although not illustrated, unit 10 includes a suitable all weather control panel including switches that turn on and off the engine 80. In the illustrated embodiment, blower 70 does not require an electrical connection and is instead mechanically driven via belt and pulleys 72. Feeder motor 54 likewise does not require an electrical connection. The control panel therefore controls the starting and stopping of engine 80 electrically, controls feeder motor 54 speed and direction and powers and receives signals from the various sensors placed on unit 10.

Figure 4:
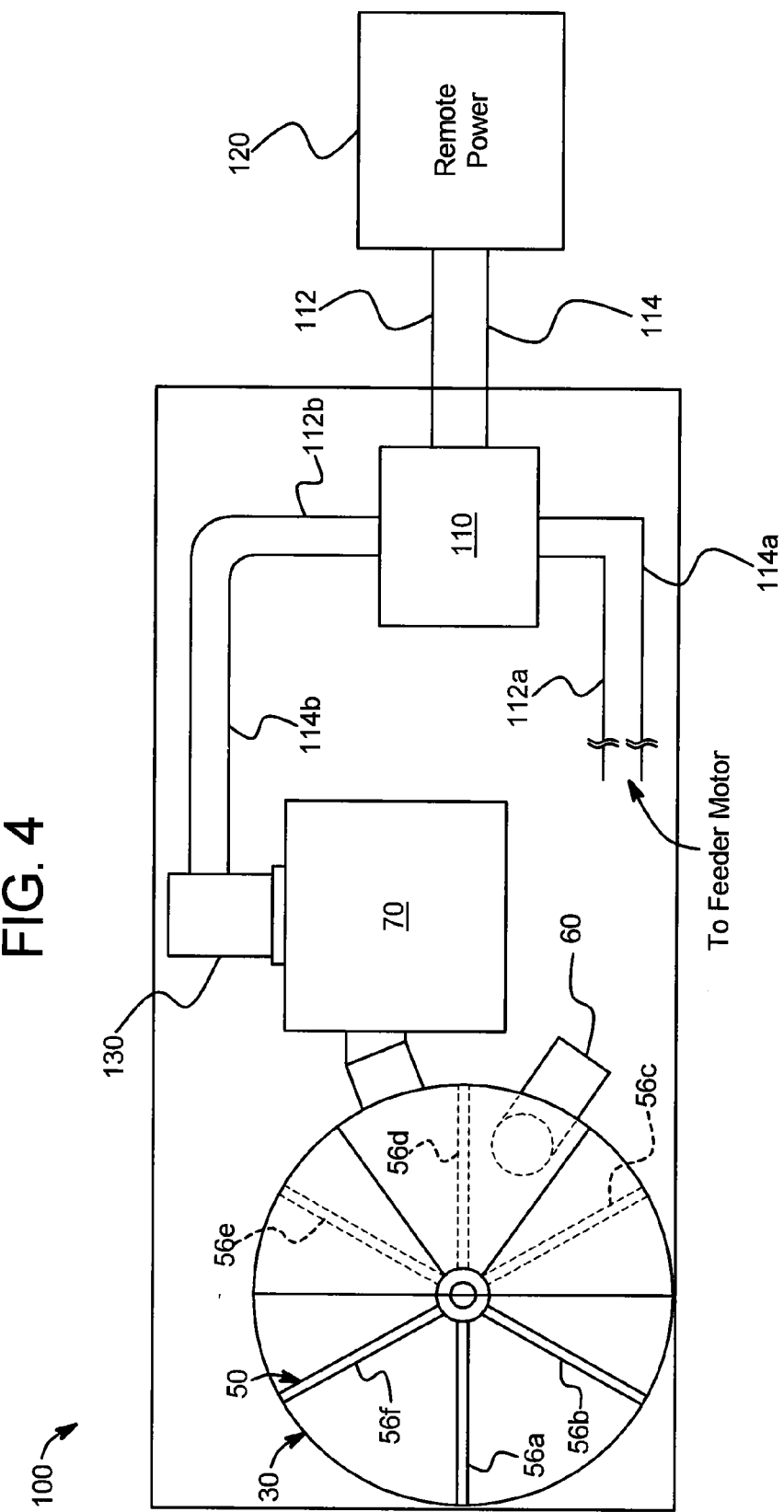
FIG. 4 is a top plan view of one embodiment of a portable pneumatic material blowing unit of the present invention having connections to a remote power source.
Figure 5:
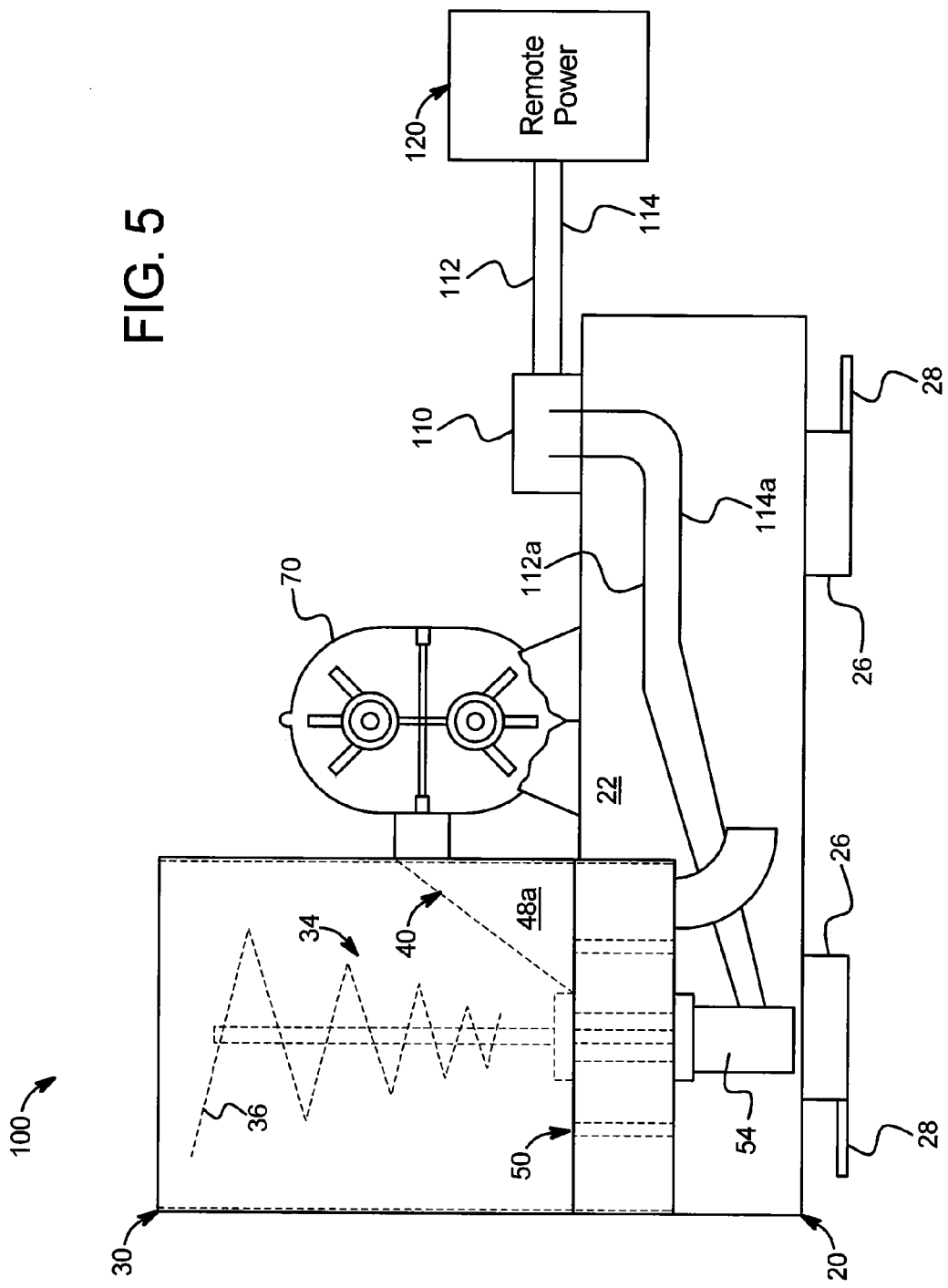
FIG. 5 is a front elevation view of the unit of FIG. 4.

Referring now to FIGS. 4 and 5, an alternative embodiment for the portable pneumatic blowing unit of the present invention is illustrated by unit 100. Unit 100 includes many of the same components described above in connection with unit 10. Those components are numbered the same as above as in FIGS. 1, 2 and 3. In particular, hopper 30, airlock 40, auger 34, feeder motor 54 remain unchanged. Base 20 may be smaller (and unit 10 lighter) because it no longer supports engine 80, the primary difference between units 10 and 100. That is, the units 10 and 100 are powered differently.

Unit 100 is not a stand alone unit. Unit 100 requires power from a remote source. In the illustrated embodiment, a hydraulic valve 110 receives pressurized hydraulic fluid from a remote source 120 via feed line 112 and returns hydraulic fluid to the source 120 via return line 114. Hydraulic valves, such as valve 110, are commercially available.

The source 120 of hydraulic power to valve 110 is any type of vehicle or power generation device having auxiliary hydraulic taps. In one preferred embodiment, the auxiliary hydraulic connections of a skid steer loader are used to provide pressurized hydraulic fluid to lines 112 and 114. One popular type of front end loader is a Bobcat™ brand loader manufactured by Melrowe Company. That skid steer loader as well as other types of machinery provide auxiliary hydraulic ports, from which unit 100 may be powered. As seen in FIG. 5, feeder motor 54 is a hydraulic motor, as is the case with unit 10. Feed line 112a extends from hydraulic valve 110 to feed pressurized hydraulic fluid to motor 54. Return line 114a returns the fluid to valve 110, which in turn returns fluid via line 114 to remote power source 120.

The blower 70, which was driven by belt and pulley via engine 80 in FIGS. 1 to 3 is now powered via a second hydraulic motor 130 on unit 100. Output shaft of motor 130 is coupled to a shaft of feeder 70 to drive the feeder. A feed line 112b feeds hydraulic fluid from valve 110 to hydraulic motor 130. Return line 114b returns hydraulic fluid from motor 130 to valve 110, which in turn returns fluid via return line 114 to remote power source 120.

The operation of unit 100 is similar to that of the operation of unit 10. Valve 110 includes connections, such as quick disconnect connections, which enable lines 112 and 114 to be readily connected and disconnected to/from unit 100. Once those connections are made, power source 120 can begin to power unit 100. A control panel (not illustrated) operates valve 110 electrically to allow unit 110 to be turned on and shut down without cycling power source 120 on an off in one embodiment. One or more operators 14 or 16 feeds material 12 into hopper 30 and mans hose 90 as described above. Unit 100 also includes various sensors, such as pressure and motion sensors, that signal alarm conditions and shut down the unit appropriately. Feeder 50 is reversible and may be driven at different speeds as desired. Auger 34 may also be reversible to help alleviate a jam in feeder 50. Unit 100 can also be operated remotely as described above.

Figure 6:
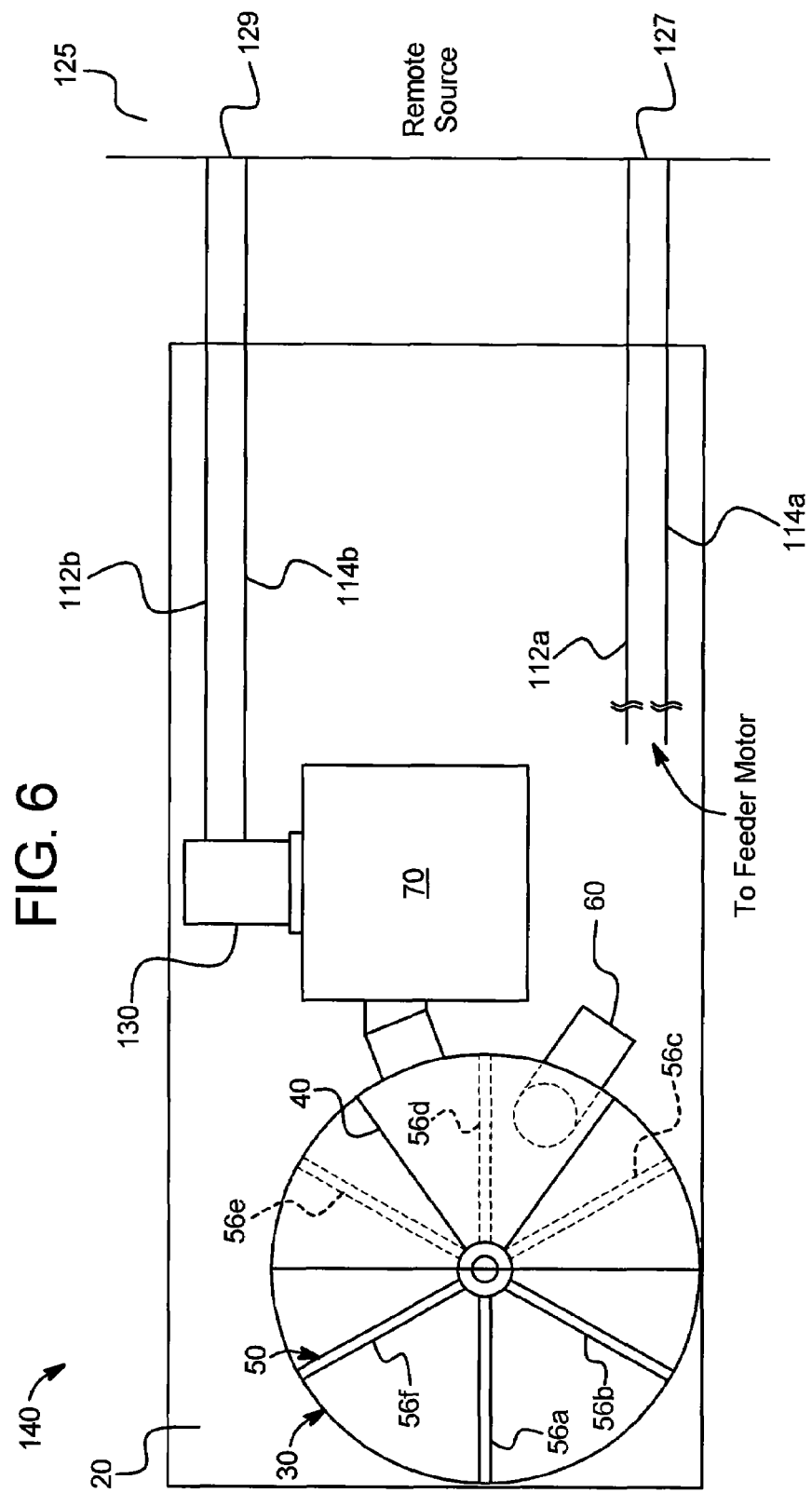
FIG. 6 is a top plan view of an alternative embodiment of a portable pneumatic material blowing unit of the present invention having connections to a remote power source.

Referring now to FIG. 6, an alternative embodiment for the portable blowing unit of the present invention is illustrated by unit 140. Unit 140 includes many of the same components described above in connection with unit 100, namely, those components that are numbered the same above in FIGS. 4 and 5. In particular, hopper 30, airlock 40, auger 34, feeder 50, feeder motor 54 and blower 70 remain unchanged. Base 20 is of approximately the same size as the base 20 used for unit 100 of FIGS. 4 and 5. The units 100 and 140 are powered similarly, namely, via a remote power source.

Unit 140, like unit 100, is not a stand-alone unit. Unit 140 requires power from a remote source 125. Remote source 125 may be of any of the types described above for remote source 120, such as a skid steer loader as described above. Remote power source 125 differ from remote power source 120 because power source 125 includes multiple auxiliary power attaching connections 127 and 129. As illustrated, hydraulic fluid feed and return lines 112a and 114a extend from power connection 127, while hydraulic feed and return lines 112b and 114b extend from connection 129. As illustrated in FIG. 6, hydraulic lines 112a and 114 drive the feeder motor as shown above in FIGS. 4 and 5. Hydraulic lines 112b and 114b in turn power blower motor 130 and blower 70 as discussed above in connection with FIGS. 4 and 5.

Remote source 125 having multiple hydraulic connections or taps 127 and 129 enables hydraulic valve 110 used above in connection with FIGS. 4 and 5 to be eliminated. Hydraulic valve 110 on the other hand parceled hydraulic power between the two motors. Although not illustrated, hydraulic lines 112a to 114b may be configured with electric or hydraulic control valves coupled to a control panel, which may in turn be controlled remotely, so that an operator can selectively and separately or simultaneously run and not run feeder motor 54 and blower motor 130. In FIG. 6, the parceling of hydraulic power to tape 127 and 129 occurs within alternative remote power source 125. Indeed, alternative source 125 can include more than two sets of hydraulic connections, wherein other hydraulic devices on unit 140 can be driven. For example, the additional hydraulic taps could drive the control side of hydraulic valves that control whether hydraulic power goes to feeder motor 54 or blower motor 130.

Figure 7:
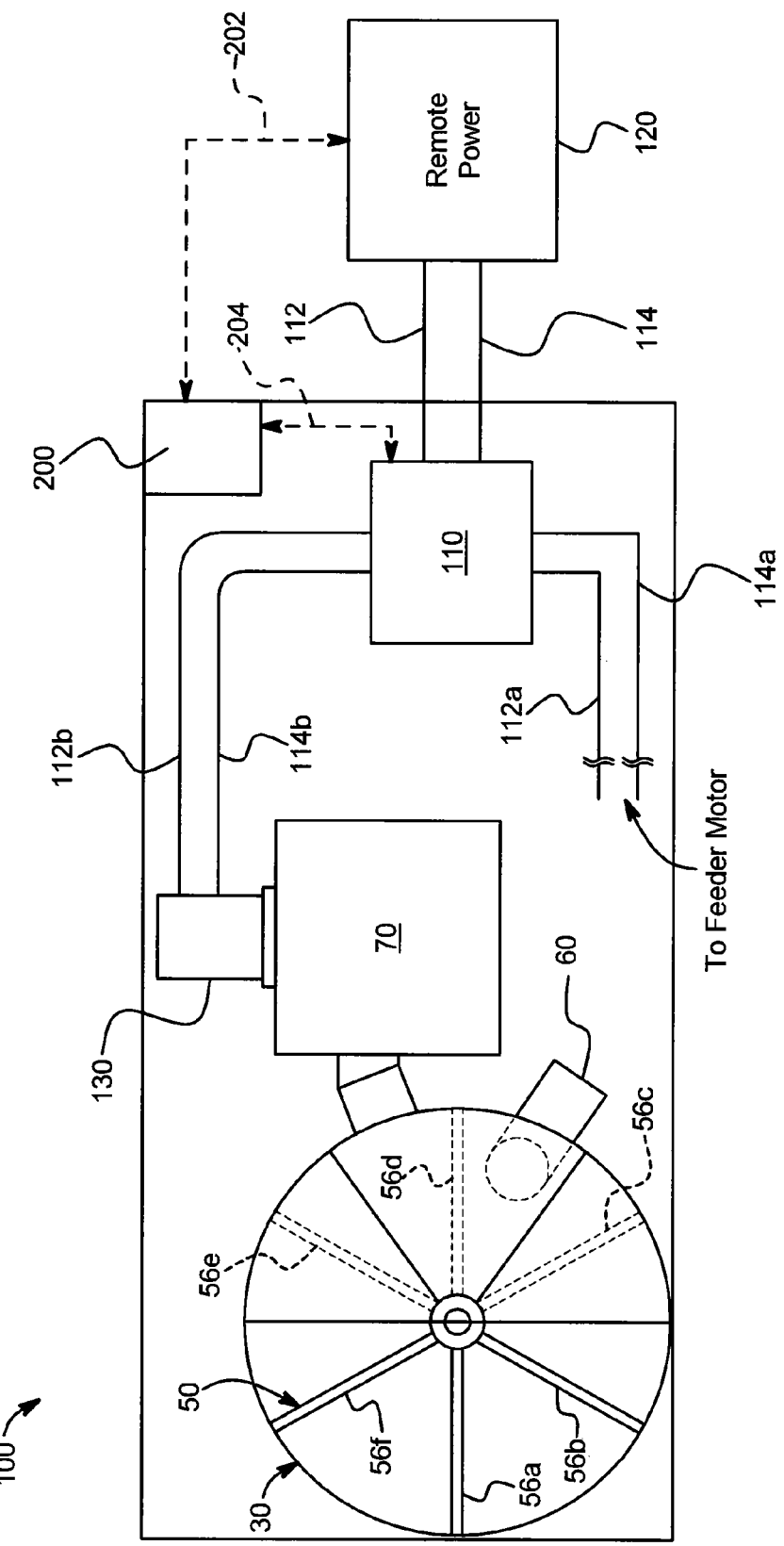
FIG. 7 is top plan view of an embodiment of a portable pneumatic material blowing unit of the present invention having electrically controlled hydraulics.

Referring now to FIG. 7, one possible control scheme is illustrated by control box 200. In the illustrated embodiment, control box 200 electrically controls unit 100 described above in connection with FIGS. 4 and 5. It should be appreciate however that control box 200, or a similar control box, is operable with any of the embodiments described herein, including unit 10 of FIGS. 1 and 2 as well as unit 140 of FIG. 6.

Control box 200 is skid mounted in one embodiment and includes a suitably rated enclosure, e.g., NEMA rated for outdoor use, so that units 10, 100, and 140 may be used in virtually any environment. In an alternative embodiment, a portion or most all of the unit is enclosed in a housing that is rated for outdoor use, wherein control box 200 can have a different rating if placed inside such overall outdoor use housing. Control box 200 includes all switches, lights, displays, electronics, internal wiring, relays or microprocessor based controllers necessary to enable operator 14 and/or 16 to control the portable unit as described herein. Control box 200 in an embodiment includes suitable electrical equipment to receive RF or other remote signal commands from a remote operator and also to send suitable messages back to that operator via such signals.

Electrical control box 200 supplies electrical power via electrical line 202 to the remote power source. Line 202 as indicated by the double arrows enables two way electrical communication in one embodiment. Control box 200 in one embodiment opens and closes solenoid valves to enable/disable power to flow hydraulically from source 120 to valve 110 and/or return via line 114 from source 110 to remote power source 120. Control box 200 can also receives messages from remote power source 120 and display those messages at box 200 or remotely to an operator 16, for example, on a remote hand held unit. In one embodiment, electrical line 202 is a flexible or umbilical type electrical connection.

An electrical line 204 is connected between control box 200 and valve 110. Electrical line 204 is also a two-way electrical line in one embodiment. Electrical power line 204 enables hydraulic power to be provided selectively to one or more of the feeder motor 54 and/or the blower motor 130, e.g., via electrically operated hydraulic solenoid value. As described above, remote operator control is one preferred method of operating the pneumatic blowing systems of the present invention. The electrical control shown in FIG. 7 enables remote operator 16 to operate at least one or more, or all of the following functions remotely: blower speed, rotational speed of feeding apparatus, and on/off control of the feeding apparatus. It is also possible to control remotely the on/off status of the blower, however, it may be desirable for safety reasons to require the operator to be located at control unit 10, 100 or 140 to turn blower 70 on and off.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A portable landscape/construction material blowing unit comprising:
   a base;
   a material hopper supported by the base, the hopper including an opening sized and positioned to receive a supply of material;
   an augur carried within the material hopper, the augur at least substantially vertically aligned and configured to contact at least a portion of the supply of material near the opening and transport said portion away from the opening;
   a hose extending from the hopper, the hose including a distal end through which material exits the hose;
   a blower supported by the base and connected fluidly to the hopper, the blower operable to force air through the hopper and material through the hose; and
   wherein the base, hose, hopper and blower are configured and arranged to be transported on another device.

2. The portable unit of claim 1, which includes a power supply device supported by the base, the power supply device operable to run the blower.

3. The portable unit of claim 2, wherein the power supply device additionally powers a motor that operates a feeder.

4. The portable unit of claim 3, wherein the power supply device is an engine that is mechanically coupled to the blower and hydraulically coupled to the feeder motor.

5. The portable unit of claim 1, which includes a feeder that receives material from the hopper and air from the blower.

6. The portable unit of claim 5, wherein the feeder is integral to the hopper.

7. The portable unit of claim 5, wherein the feeder is located at a bottom portion of the hopper and the hose extends from the hopper at a position below the feeder.

8. The portable unit of claim 5, wherein the hose extends from a side portion of the hopper.

9. The portable unit of claim 1, which includes a device configured to receive a pressurized supply of fluid, the fluid used to power the blower.

10. The portable unit of claim 9, wherein the fluid is used to power a motor connected mechanically to the blower.

11. The portable unit of claim 9, wherein the fluid is used additionally to power a motor that operates a feeder.

12. The portable feeder of claim 1, wherein the hopper has a material capacity of about three to ten cubic feet.

13. The portable feeder of claim 1, wherein the hopper, blower and hose are operable to blow a material selected from the group consisting of: bark, mulch, fertilizer, compost, wood chips, soil, peat moss, gypsum, dry grass clippings, leaves, seed, herbicides, pesticides or other chemicals, gravel/stone, processed straw and hay, sawdust and any combination thereof.

14. The portable feeder of claim 1, wherein the augur is a spiral auger positioned inside the hopper, the spiral auger operating to push material towards a position on the hopper that communicates fluidly with the hose.

15. The portable feeder of claim 1, wherein the base defines at least two apertures sized and positioned to receive forks of a fork lift or skid steer loader.

16. The portable feeder of claim 1, which is reversible to alleviate a jam caused by the material.

* * * * *